United States Patent [19]

Nasica

[11] 3,765,976
[45] Oct. 16, 1973

[54] APPARATUS AND METHOD FOR PRODUCING CONTAINER WITH COMPOSITE WALLS

[75] Inventor: Jean Roger Nasica, Paris, France

[73] Assignee: Intercan S.A., Fribourg, Switzerland

[22] Filed: July 6, 1970

[21] Appl. No.: 52,240

[30] Foreign Application Priority Data
July 9, 1969 Switzerland............... 10525/69

[52] U.S. Cl............ 156/105, 100/151, 100/179, 100/213, 156/212, 156/218, 156/228, 156/261, 156/322, 156/471, 156/485, 156/497, 156/511, 156/517, 156/593, 264/89, 264/90, 264/92, 425/387, 425/388
[51] Int. Cl............ B32b 1/00, B32b 31/20
[58] Field of Search............ 156/105, 212, 217, 156/218, 228, 261, 468, 470, 471, 475, 476, 481, 483, 484, 485, 497, 500, 511, 517, 529, 593, 198, 285, 287, 322, 382; 100/151, 179, 213

[56] References Cited
UNITED STATES PATENTS

| 3,446,686 | 5/1969 | Butler et al............ 156/229 X |
|---|---|---|
| 3,141,595 | 7/1964 | Edwards............ 156/79 X |
| 3,551,239 | 12/1970 | Newton............ 156/475 X |
| 2,660,761 | 12/1953 | Peters............ 156/212 X |
| 2,736,065 | 2/1956 | Wilcox............ 156/212 X |
| 3,205,110 | 9/1965 | Rinderspacher et al........ 156/242 X |
| 3,227,054 | 1/1966 | Helms et al............ 156/244 X |
| 3,528,865 | 9/1970 | Amberg et al............ 156/229 X |
| 3,337,664 | 8/1967 | Lyon............ 264/92 X |
| 3,357,053 | 12/1967 | Lyon............ 264/89 X |
| 3,366,019 | 1/1968 | McGee............ 425/388 |
| 3,027,596 | 4/1962 | Knowles............ 264/92 |

FOREIGN PATENTS OR APPLICATIONS

| 970,508 | 9/1964 | Great Britain............ 264/92 |

Primary Examiner—Alfred L. Leavitt
Assistant Examiner—C. B. Cosby
Attorney—Young and Thompson

[57] ABSTRACT

A container is formed from sheet material in a female mold which has an open top and a bottom that is multi-perforate. The bottom moves relative to the side walls of the mold and is advanced to the open top of the mold to contact the sheet material. Vacuum is then applied through the holes of the mold bottom to draw the sheet flat against the mold bottom, after which the mold bottom is retracted to the bottom of the mold to draw the sheet material down into the mold. Heated thermoplastic sheet material can then be laminated to the sheet material in the mold and the container completed. The sheet material thus drawn into the mold is accurately positioned, which is advantageous when the sheet material is printed so that correct registry is important.

3 Claims, 8 Drawing Figures

FIG. 3

Patented Oct. 16, 1973  3,765,976

INVENTOR
JEAN ROGER NASICA
BY Young & Thompson
ATTYS.

FIG. 7

APPARATUS AND METHOD FOR PRODUCING CONTAINER WITH COMPOSITE WALLS

The present invention concerns a container, the walls of which are at least in part made of composite material and an apparatus for producing such containers with at least part of their walls made of composite materials, mainly for packaging.

The composite walls of such containers are made, in general, of a sheet of thermoplastic material covered with a reinforcing sheet which may be decorated or not. The reinforcing sheets are of any kind, for example cardboard, thermoplastic material, aluminium, etc. and, on the side which will be in contact with the side wall of the container, these sheets are provided with a heat-sealing adhesive which may stick intimately to the side wall of the thermoplastic container.

The method for producing such containers with composite or reinforced walls comprises placing the reinforcing sheet in a female mould, placing a previously heated thermoplastic sheet onto the opening of the female mould, preforming a container blank by means of a punch which deforms said thermosplastic sheet while it penetrates into the mould and completing this shaping of the container by means of a pressurized fluid applied to the blank on the side of the punch and pushing said blank against the wall of the mould to make it adhere intimately to the reinforcing sheet previously placed in the mould.

Hitherto it has been found difficult to introduce the reinforcing sheet into he mould and to maintain it in an accurate position inside the mould and as a result, containers of this kind have frequently their reinforcing sheets badly registered with the thermoplastic container which they surround. This drawback is especially pronounced in case the outer face of the reinforcing sheet is provided with a decoration which would then no longer be in harmony with the outer shape of the container.

The present invention overcomes this difficulty and proposes to provide both an improved container with at least part of its walls made of a composite material and an apparatus for producing such containers with at least part of their walls made of composite material for packaging, this apparatus permitting automatic introduction of reinforcing sheets into the mould and to maintain them inside the mould in an accurate position.

To this effect, the apparatus for producing containers with at least part of their walls made of composite material, comprises on a frame, a cylindrical support for a roll of thermoplastic sheet, means for transporting such sheet underneath a heating station, then into a shaping station comprising on one side of the thermoplastic sheet at least a series of female moulds which are movable perpendicularly to the plane of the thermoplastic sheet and extending over the entire width of said sheet and on the other side, a series of preshaping punches, the number of which corresponds to the number of moulds, a series of mould-clamps for applying said thermoplastic sheet against the upper end of the moulds and a source of pressurized fluid for the final shaping of the containers, this apparatus being distinctive in that each female mould is provided with a bottom movable with respect to the side walls of the mould and capable to be moved in a so called receiving position located in a plane slightly superior to the one of the opening of the mould when the latter is in its lowermost position, that the cutting means and the driving rollers of a reinforcing sheet for each mould are located in approximately the same plane than the one corresponding to the receiving position of the bottom of the mould and close to the side walls of the mould, that the bottom of the mould is provided with small ducts opening to the upper side of the latter and capable to be connected to a vacuum pump and that sequential means capable of producing successively the reciprocal approach of the cutting means, the stay of the driving means, the connection of the ducts of the bottom of the mould with a vacuum pump, the relative displacement of the bottom of the mould with respect to the side walls of the mould and the lifting of the whole mould into its active position, are provided.

Thus, an accurate positioning of the reinforcing sheet and its securing in that position inside the mould is not achieved until after overmoulding of the said reinforcing sheet with the thermoplastic sheet which, under the action of the pneumatical pressure applied on its side opposite the one facing the reinforcing sheet so that it is exactly shaped according to the internal shape of the mould and sticks intimately to said reinforcing sheet which has been previously shaped. It is easy to understand that it is thus possible to control permanently the various steps required for the production of containers with composite walls with all the required precision. The reinforcing sheet provided to cover at least part of the outer surface of the container may be in the form of a web and the blank of reinforcing sheet associated to each container is cut only when it is prepositioned and secured to the bottom of the mould in its prehension position.

The object of the present invention will be better understood from the following description of a preferred embodiment of the apparatus, given only by way of example, with reference to the accompanying drawing in which.

Since the present invention is specially directed to the various means permitting to feed a female mould with a reinforcing sheet and to position latter exactly in the mould, the whole apparatus for the production of containers made from a thermoplastic sheet at least part of the walls of which are composite will not be described hereafter in detail.

Figure 2:
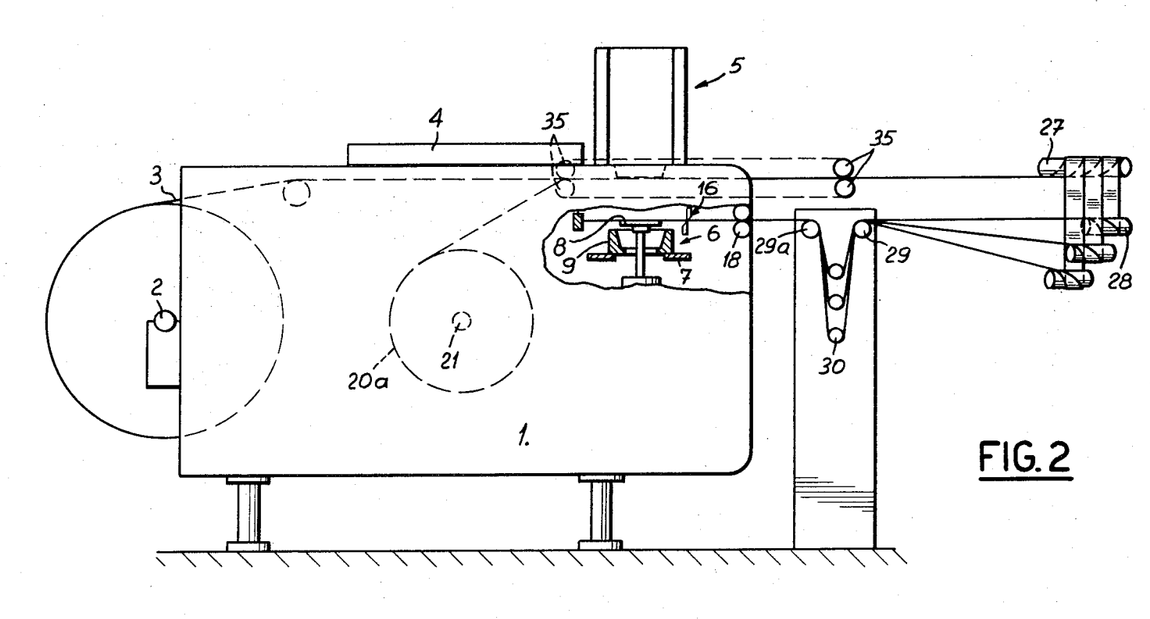
FIG. 2 is a side elevation of the apparatus of FIG. 1.
Figure 3:
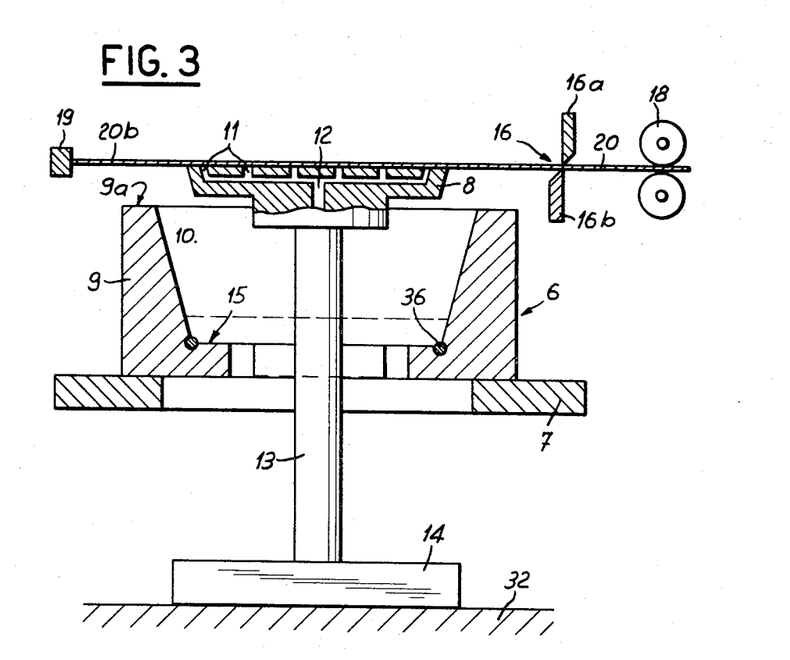
FIG. 3 is a diagrammatical view of a vertical section across the mould and the cutting means.

It is well known that this kind of apparatus (FIGS. 1 and 2) comprises at the back end of a frame 1 a cylindrical support 2 for the roll of a web-fed thermoplastic sheet 3, means for transporting said sheet underneath a heating station 4 and then into a shaping station 5 including on one side of the thermoplastic sheet 3 at least a series of female moulds 6 movable perpendicularly to the plane of the thermoplastic sheet 3, and extending onto the whole width of the said sheet 3, and on the other side of preshaping punches, the number of which corresponds to the one of the moulds, a series of mould-clamps 17, a single one of which is shown in FIG. 3, providing for securing the said thermoplastic sheet 3 to the upper edge 9a of mould 6 and a source of pressurized fluid for final shaping of the containers and driving means for the mould 6 to locate them in a higher position where their upper edge is in contact with the thermoplastic sheet 3 and a lower position where the moulds are completely disengaged from the containers which have been shaped.

The female mould 6 shown on FIG. 3 has a horizontal section of polygonal shape, preferably rectangular or trapezoidal This mould 6 is resting on a support 7 capable of moving vertically so that mould 6 may occupy a high and low position.

This mould includes a bottom piece or element 8 movable with respect to the body 9 of the mould, confining a cavity 10 of parallelepipedic or pyramidal shape. The bottom piece 8 of the mould comprises at its top or inner face a number of small aspiration ducts 11 connected through a collector bore 12 provided in the bottom part of the mould and supporting rod 13 of the said bottom piece 8 and capable to be connected with a vacuum pump not shown in the drawing. The supporting rod 13 is set up on a supporting plate 14 which when the bottom piece 8 is in contact with the body 9 of the mould is moving upwards and downwards simultaneously with the bottom 8 of the mould. A fixed bed - plate 32 limitates the downward movement of the bottom 8 of the mould and when the body 9 of the mould continues its downward movement, the bottom 8 of the mould leaves the body 9 of the mould. The downward movement of the body 9 of the mould is preferably limited by an abutment not shown.

As shown in FIG. 3, when the body 9 of the mould is in its lower position, the top side of the bottom 8 of the mould on which ducts 11 open up, is in a so called prehension position, that is in a plane slightly above the top opening of the body 9 of the mould in this position. The bottom of the mould 8 is then at a distance of the plane of the thermoplastic sheet 3 at least equal to the depth of the body 9 of the mould and of the top part 16a of cutting means 16. When the body 9 of the mould is in its upper position, in which the latter is in contact with sheet 3 through its top edge 9a, the bottom 8 of the mould closes up the bottom opening of the body 9 of the mould and its bottom face abuts on an internal shoulder 15 of the body 9 of the mould provided with tightening means 36, while plate 14 is slightly raised above that plate 32.

Cutting means 16 (FIG. 3) are provided in the same plane as defined by the so called prehension position of the bottom 8 of the mould and are provided on one side of body 9 of the mould which, as represented on FIG. 3, is in its lower most position.

The cutting means 16 comprise, for example, a fixed blade 16a and a moving blade 16b. In the feeding direction of the reinforcing sheet 20, a pair of driving rollers 18 is provided upstream with respect to cutting means 16 and on the same side of the body 9 of the mould are the said cutting means 16. On the other side of the mould, with respect to cutting means 16, and in a plane corresponding to the lowermost position of the bottom 8 of the mould, with respect to the body 9 of the mould in its lowermost position, an abutment means 19 forming part of a sequential device not shown is provided for determining among other things the lengths of the portion of a reinforcing sheet 20 which is web-fed between the drive rollers 18 and cutting means 16 on the top side of the bottom 8 of the mould until it abuts with abutment means 19 forming part of a sequential device and which determines the length of a portion of reinforcing sheet between the said abutment means 19 and the cutting means 16. This sequential device may control the actuating of cutting means 16 and driving rollers 18 and also the connecting device of duct 11 with a vacuum pump and the actuating means of support 7 producing the displacement of body 9 of the mould.

Figure 1:
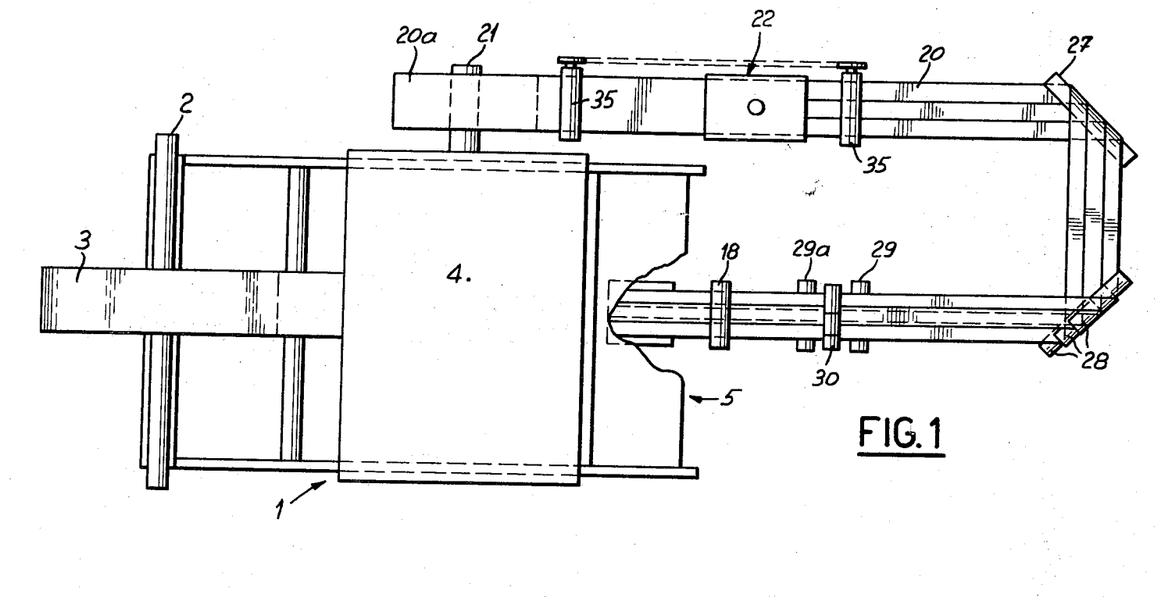
FIG. 1 is a plan view, with partially broken up sections, of the apparatus.
Figure 7:
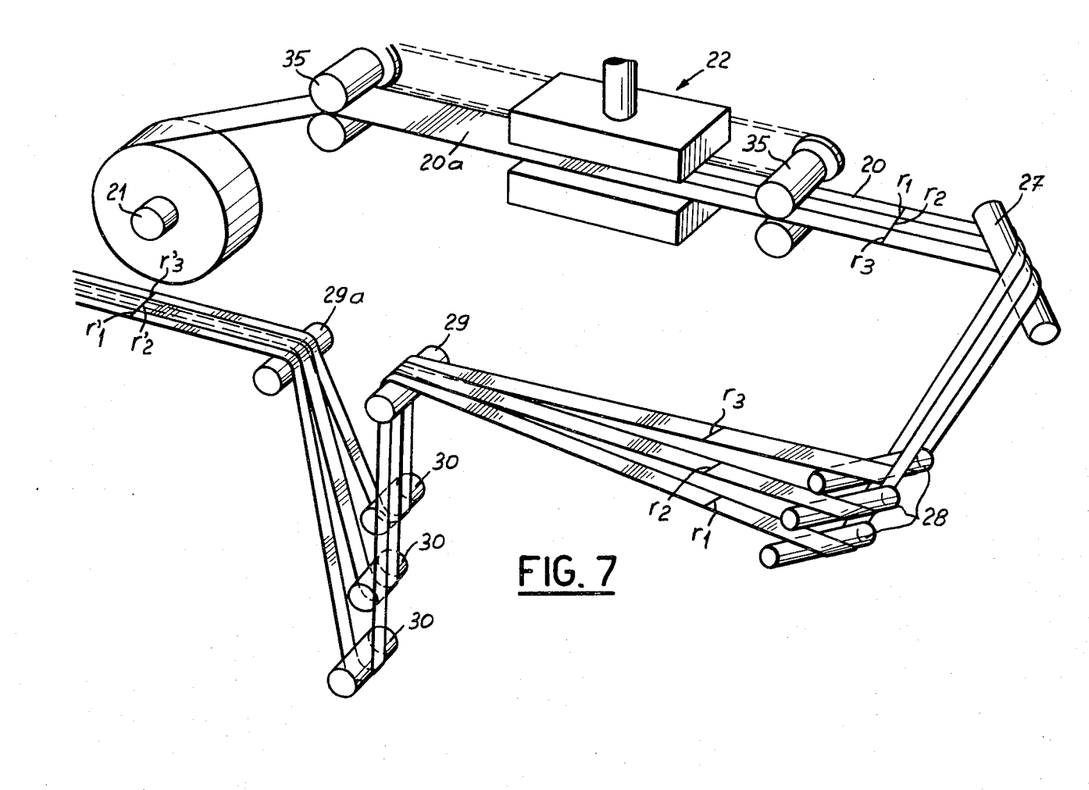
FIG. 7 is a part view in perspective of the driving rollers, of the cutting mechanism and of the stretching and reversing means of the reinforcing sheet.

Since each mould 6 will receive a reinforcing sheet 20, it is of advantage to provide the various reinforcing sheets 20 in the form of a web-cut from a wider sheet or so called mother sheet. Therefore, as shown in FIGS. 1, 2 and 7, there is provided on one side of frame 1, a cylindrical support 21 for a roll of web-fed mother sheet 20a, a cutting mechanism 22 to divide it in individual webs 20 and a common step by step driving mechanism of the reinforcing mother sheet 20a and of the various reinforcing sheets cut into webs 20. Preferably, the supporting shaft 21 of reinforcing mother sheet 20a, the cutting mechanism 22 and the step by step driving mechanism of reinforcing mother sheet and the various individual reinforcing sheets cut into webs 20 are set up besides the heating station 4 and shaping station 5, parallel to the pass of thermoplastic sheet 3.

The reinforcing mother sheet 20a is cut into several reinforcing sheets 20 which are subsequently cut into rectangles or, for example, in the shape shown on FIG. 6. Each reinforcing sheet 20 when leaving the cutting section 22 has for example the shape of a series of developped, parallelepipeds 23 separated from each other in their marginal area by cut-outs 24, so that different portions of reinforcing sheets 23 remain attached to each other by their front and rear ends 25 until they are finally positioned over the bottom 8 of the mould. The cut out area 24 is confined on one hand by the upward edges of the small sides 41 of the developped parallelepiped 23 and on the other hand by the free edge of flaps 40 provided on the large sides 42 of developped parallelepiped 23, these flaps 40 being provided for insertion inside the mould 8 underneath the vertical edges of the said small sides 41. Where further cutting and folding of these parts of sheet 23 will take place, the cutting mechanism 22 provides areas of lesser resistance shown by dots 25 along which cuttings will take place and thin lines 26 along which foldings will take place.

The thus cut reinforcing sheets 20 positioned side by side (FIG. 7) are driven step by step in synchronism with thermoplastic sheet 3 towards female moulds 6 and the forming station 5 by pairs of driving rollers 35 and over reversing roller 27 with horizontal axis provided after driving rollers 35 at an angle of for example 45° with respect to the median longitudinal axis of mother sheet 20a or more precisely with respect to the average axis of individual reinforcing sheets 20 as they leave the cutting station 22 side by side, after which the said reinforcing sheets 20 are led individually over separating rollers 28 of horizontal axis, parallel to each other and in number corresponding to the number of reinforcing sheets 20 when cut and separated. Rollers 28 are provided for separating or bringing together the individual reinforcing sheets 20 after they had passed the reversing roller 27 so as to permit their sidewise adjustment. Therefore, if a sidewise overlapping between reinforcing sheets 20 is required, the separating rollers 28 will have to be adjusted accordingly. In case two sheets 20 are to be overlapped sidewise by a third central sheet, the rollers 28 are positioned on one hand in different horizontal planes with an inclined horizontal axis, for example of 45° also, with respect to the longitudinal axis of the corresponding reinforcing sheet 20 delivered from roller 27 and on the other hand so that the horizontal axis are in different vertical planes. Therefore, registering marks $r_1$, $r_2$ and $r_3$ provided each respectively on adjacent reinforcing sheets 20 and in line, after leaving driving rollers 35, in a direction at right angle to the pass of the said reinforcing sheet 20 will be set off, after passing over rollers 28 which are themselves set off one with respect to the other.

If an overlapping in which two side sheets overlap sidewise a third central sheet is preferred, all that is required is to place the axis of the rollers 28 associated with the two first reinforcing sheets in horizontal planes which are above the horizontal plane in which the separating roller 28 associated with the third lower reinforcing sheet is located, while maintaining the same inclination and lateral offsetting of the longitudinal axis so that these are located in different vertical planes, the distances between the various vertical planes containing the horizontal and parallel axis, determining the amount of overlap of reinforcing sheets 20.

Once separated by rollers 28 and after the overlapping occurs first on roller 29 provided with a horizontal axis and at right angle with respect to the pass of reinforcing sheets 20, the latter passe separately over stretching and regulating rollers 30 with an axis parallel to each other and located in different horizontal planes and also equal in number to the number of reinforcing sheets 20 obtained from reinforcing mother sheet 20a.

Since these stretching and regulating rollers 30 are located in different horizontal planes and are mounted adjustably in the vertical direction, they permit to adjust, by letting reinforcing sheets 20 travel on a more or less long path, the positions of the decorations or of the front or rear ends 25 of the reinforcing sheet portions 20, so that once they have passed over an other guiding roller 29a, a registration mark, for example $r'_1$, is in alignment with two other registration marks $r'_2$ and $r'_3$ of the other corresponding sheets 20. This permits that, when the overmoulding of each actual container over the part of reinforcing sheet takes place, as explained hereafter, the decorations for a series of finished containers, that is reinforced containers, are positioned in identical positions with respect to a fixed point of the container.

Figure 8:
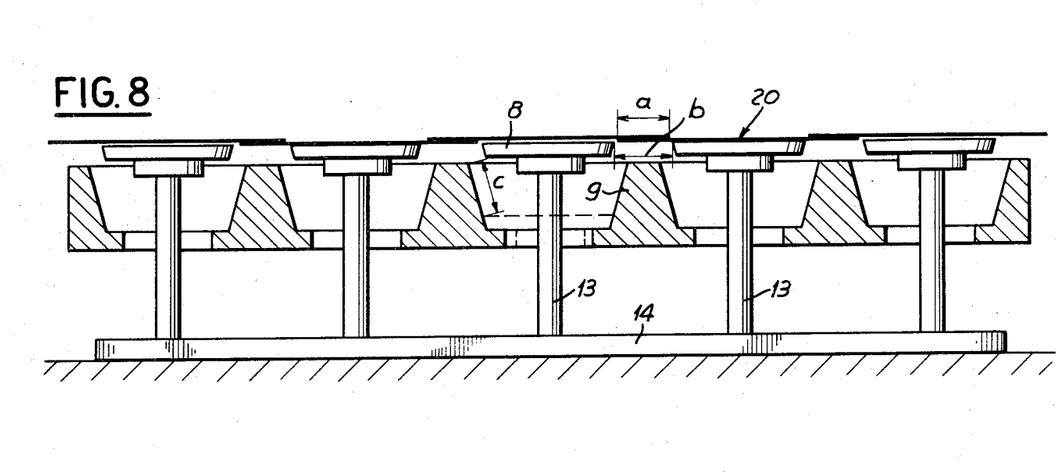
FIG. 8 is a part sectional view of the series of moulds showing the positioning of the reinforcing sheets with respect to the female moulds.

After passing over guiding roller 29a parallel to rollers 29 and 30, the reinforcing sheets 20 which overlap each other are directed to a driving roller 18 and cutting means 16 (FIG. 3) to occupy a position such as shown in FIG. 8 where it can be seen that each reinforcing sheet 20 is positioned above a bottom of mould 8.

In actual fact, the object being to align the decorations of reinforcing sheets 20 with respect to containers formed in the forming station 5 and to reduce waste to a minimum, one has to arrange an overlapping of reinforcing sheet 20 such that the marginal parts $a$ of two adjacent reinforcing sheets 20 are overlapping by a minimum distance equal to the spacing apart $b$ of two adjacent bottoms 8 of moulds or to the length $c$ of the side wall of the body 9 of the mould comprised between its upper edge and the bottom 8 of the mould when the latter in its position where it closes the bottom opening of the body 9 of the mould. Thus, at the time of overmoulding, the free edges of reinforcing sheets 20, or the folding lines 26 of the flaps 40 provided thereon, will be roughly in alignment with the inside folds of the dihedrals formed by the upper edge 31a of container 31 and the side walls of said containers 31 (see FIGS. 4 and 6).

Figure 6:
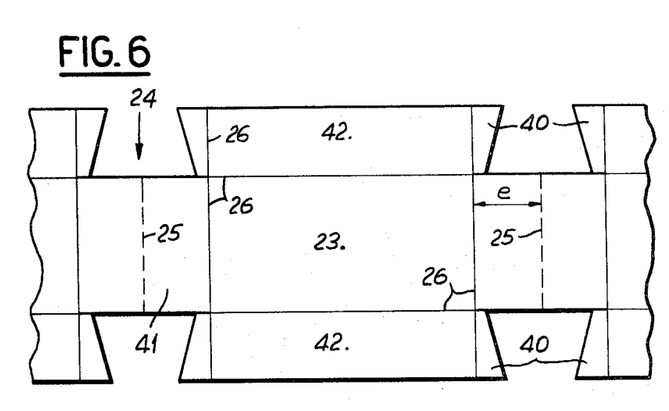
FIG. 6 is a plan view in a reinforcing sheet prior to its shaping in the female mould.

It is obvious that if the containers are only reinforced on their bottom and two side walls connected therewith at right angles to the path of reinforcing sheet 20, it is not necessary to provide the cut-outs 24 as examplified on FIG. 6. However, in this case, the various reinforcing sheets 20 will have to be held apart one from the other before reaching their corresponding mould to take into account the lateral spacing between adjacent moulds. Thus, two adjacent reinforcing sheets 20 will be subject to being held apart sidewise by a distance at least equal to the distance $a$ or $b$ (see FIG. 8) before they reach the forming station 5. This spacing of reinforcing sheets 20 achieved by off-setting the vertical planes in which the axis of rollers 28 are located by a corresponding distance, so that when leaving these rollers, the reinforcing sheets 20 are, in a plan view, spaced laterally from each other by the required distance.

Cutting means 16 are adjustably mounted in a horizontal plane between the front edge of the bottom 8 of the mould and the driving rollers 18, so that the height $e$ of the sides of the sheet which will have to be folded up, may be predetermined Obviously this height $e$ will have to remain inferior to the height $c$ of the corresponding inclined internal wall of the body of mould 9.

It is also possible to provide between cutting station 22 and reversing roller 27, a photoelectric registering cell, possibly opposite to a reinfocing sheet already preformed. Thus, when a decoration is spotted by this photoelectric cell on one of the reinforcing sheets and by taking into account the various distances between the place where the decoration was spotted and the various female moulds, it is easy to adjust the various reversing or guiding rollers 30 to obtain an accurate registration of the decoration on the finished containers.

With reference to FIG. 3, one sees that the free edge, for instance the frontal edge of a reinforcing sheet 20, abuts against abutment 19 of the sequential device which controls the length of portion 20b of the reinforcing sheet which has to be cut by cutting means 16. The sequential device controls further the aspiration within ducts 11 so as to apply firmly and immobilize the 20b portion of the reinforcing sheet on bottom 8 of the mould which is in the position shown on FIG. 3, that is in a high position with respect to the low position of the body 9 of the mould. Once the cutting of portion 20b of the reinforcing sheet is performed by cutters 16a and 16b, one lifts the body 9 of the mould until its internal shoulder 15 provided with sealing means 36 touches the rim of the bottom face of moving bottom 8 and reaches its highermost position with respect to bottom 8 of the mould. During this ascending motion of bottom 9 of the mould, the side parts of the portion 20b of the sheet are folded upwards and get laid against the internal wall of the body 9 of the mould. The body 9 of the mould continues his upwards movement and lifts thus the supporting plate 14 slightly until the upper edge 9a of the body 9 of the mould squeezes thermoplastic sheet 3 against mould clamp 17 which meanwhile has been lowered to the level of said sheet 3. In this position which is the active position, the body of the mould 9 and the moving bottom 8 form a female mould 6 in which the portion 20b of the resinforcing sheet is laid over its internal walls. The lifting of body 9 of the mould which drags the movable bottom 8 and consequently the parts to which it is secured, that is stem 13 and support plate 14, until the upper edge 9a of the body 9 of the mould is in contact with thermoplastic sheet 3 permits to produce subsequently hollow containers 31 for packaging such as shown on FIGS. 4 and 5.

These overmould containers are produced as follows: a punch 33 is lowered, which produces a preforming of container 31 after mould clamp 17 has been applied against the upper edge 9a of body 9 of the mould and the overmoulding and forming are completed by exposing the preformed plastic sheet between mould-clamp 17 and punch 33 in the body 9 of the mould to the pressure of a compressed fluid.

Figure 4:
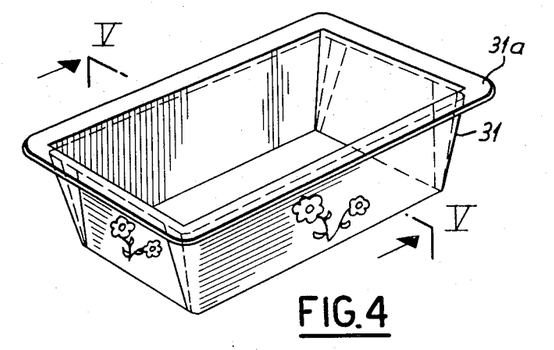
FIG. 4 is a perspective view of a container with composite walls.
Figure 5:
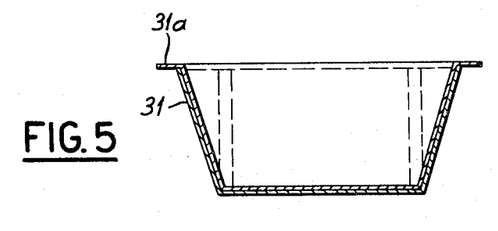
FIG. 5 is a vertical section of this container along line V—V of FIG. 4.

On FIGS. 4 and 5 showing the finished product, one sees that the reinforcing sheet provided with the decoration(s) covers the outer side of the side walls of the container which may be covered in part or completely with the said reinforcing sheet.

After the overmoulding and forming of container 31 over the portion 20b of the reinforcing sheet has taken place, the sequential device cuts first the suction in ducts 11 and controls the lowering of body 9 of the mould and bottom 8 of the mould until the latter rests with plate 14 on bed-plate 32. The body 9 of the mould is lowered further to reach again its initial position as shown on FIG. 3 and is thus completely separated from bottom 8 of the mould; the containers thus formed are then moved one step forward towards the following station of the packaging line which may be of any conventional type and is not described; the apparatus is then ready for a new production cycle.

I claim:

1. A method for producing composite containers by means of a polygonal female mold having an open end, four side walls that meet each other at the corners of the polygonal mold, and a flat bottom element movable with respect of said side walls, said flat bottom element having substantially the same size and shape as the bottom of the mold and being provided with air passages communicating with and distributed over the inner surface thereof, the method comprising the steps of
   a. imparting relative movement to said mold and bottom element so that the latter projects slightly above the open end of said mold,
   b. positioning a flat reinforcing sheet adjacent the inner face of said bottom element, said reinforcing sheet having been precut to the shape of a box blank having a rectangular bottom and flaps that overlap in the completed container to define corners of the completed container,
   c. applying suction through said bottom element thereby to hold said reinforcing sheet flat in position on said flat bottom element,
   d. imparting relative movement to said mold and bottom element with the bottom element moving at all times in parallelism to itself and centered in the mold so as to draw said reinforcing sheet into the cavity of said mold and so that said reinforcing sheet folds in the corners of the polygonal mold and said bottom element and mold are lined by said reinforcing sheet,
   e. positioning said mold adjacent a sheet of thermoplastic material, and
   f. expanding said thermoplastic sheet within said reinforcing sheet into conforming engagement therewith.

2. Apparatus for producing containers comprising a polygonal female mold having four side walls that meet each other at the corners of the polygonal mold and an open top and a separately movable flat bottom wall, said flat bottom wall having substantially the same size and shape as the bottom of the mold and having a plurality of openings extending through the upper surface thereof and said flat bottom wall being movable from a lower position closing the bottom of said mold to an upper position in which its upper surface is disposed above the top edges of said side walls, means for positioning a flat sheet of material at least partially precut to the shape of a container blank having reinforcing corner flaps that overlap the sides of the container to define corner construction in the completed container, in spaced relation above the open top of said mold, means for moving said flat bottom wall into its upper position above the open top of said mold and into flat face contacting engagement with said central area of said sheet material and for returning said bottom wall to the bottom of said mold, the said bottom wall moving in parallelism to itself at all times and being at all times centered in the mold, and means for applying vacuum to said openings whereby said central area of said flat sheet of material is drawn and held against the top surface of said bottom wall while said bottom wall is in its upper position by the vacuum in said openings and the areas of said sheet material which are disposed about said central area thereof are drawn down against the side walls and fold in the corners of said mold when said bottom wall is returned to the bottom of said mold.

3. Apparatus according to claim 2 wherein reciprocable punch means is disposed above the open top of said mold and arranged to form a layer of thermoplastic material inside said mold and sheet material from a flat preheated thermoplastic sheet interposed between said reciprocable punch means and the open top of said mold after said flat bottom wall is moved downwardly to the bottom of said mold.

* * * * *